(12) United States Patent
Jitaru (10) Patent No.: US 7,009,850 B2
(45) Date of Patent: Mar. 7, 2006

(54) SOFT SWITCHING CONVERTER USING CURRENT SHAPING

(75) Inventor: Ionel D. Jitaru, Tucson, AZ (US)

(73) Assignee: DET International Holding Limited, Grand Cayman (CY)

( * ) Notice: Subject to any disclaimer, the term of this patent is extended or adjusted under 35 U.S.C. 154(b) by 0 days.

(21) Appl. No.: 10/511,114

(22) PCT Filed: Apr. 11, 2003

(86) PCT No.: PCT/CH03/00243

§ 371 (c)(1),
(2), (4) Date: Apr. 22, 2005

(87) PCT Pub. No.: WO03/088467

PCT Pub. Date: Oct. 23, 2003

(65) Prior Publication Data

US 2005/0226009 A1 Oct. 13, 2005

Related U.S. Application Data

(60) Provisional application No. 60/372,172, filed on Apr. 12, 2002.

(51) Int. Cl.
*H02M 3/335* (2006.01)

(52) U.S. Cl. .................................. 363/17; 363/132

(58) Field of Classification Search ............ 363/15–17, 363/98, 132
See application file for complete search history.

(56) References Cited

U.S. PATENT DOCUMENTS

| | | | | |
|---|---|---|---|---|
| 5,619,404 A | * | 4/1997 | Zak | 363/21.09 |
| 5,877,951 A | * | 3/1999 | Mweene | 363/98 |
| 6,567,285 B1 | * | 5/2003 | Cho et al. | 363/132 |
| RE38,196 E | * | 7/2003 | Vinciarelli et al. | 363/16 |
| 6,862,195 B1 | * | 3/2005 | Jitaru | 363/17 |
| 2002/0122318 A1 | | 9/2002 | Guerrera | |

FOREIGN PATENT DOCUMENTS

EP 0 430 242 A2 6/1991

OTHER PUBLICATIONS

Dedoncker et al, A Three-Phase Soft-Switched High Power Density DC/DC.., University of Wisconsin, Dept. of Electrical and Computer Engineering, 1988 IEEE, pp. 796-805.
Patterson et al, Psuedo-Resonant Full Bridge DC/DC Converter, University of Wisconsin, Dept of Electrical and Computer Engineering, 1987 IEEE, pp. 424-430.
* cited by examiner

*Primary Examiner*—Gary L Laxton
(74) *Attorney, Agent, or Firm*—Gallagher & Kennedy, P.A.; Thomas D. MacBlain (57) ABSTRACT

A converter topology that eliminates reverse recovery losses in its output rectifying semiconductor devices employs an AC injection voltage source in series with a power transformer primary winding. Input semiconductor switches in the converter's primary circuit are controlled to provide in the power transformer secondary a voltage across the winding or windings in a first direction forward biasing one of the output rectifying devices followed by a lower level reverse biasing voltage produced by the injection voltage. This lower level voltage across the secondary turns off the previously conducting rectifier device and drives carriers out of its semiconductor junction or junctions to eliminate reverse recovery losses occurring when the secondary applies a higher level reverse bias across the non-conducting rectifier device. The injection voltage source can be a transformer in addition to the power transformer having a primary winding in series with the primary winding of the power transformer and a secondary winding connected to ground through a capacitor. In addition to preventing reverse recovery losses in the rectifying devices in the secondary, the injection voltage transformer also injects an AC triangular waveform current into the current in the converter primary input circuit to the junction of the semiconductor switches where they are connected in a bridge circuit supplying the power transformer primary. By this, the injection voltage source assures zero voltage switching of the semiconductor switches even at light loads.

41 Claims, 6 Drawing Sheets

SOFT SWITCHING CONVERTER USING CURRENT SHAPING

CROSS REFERENCE TO RELATED APPLICATIONS

Priority is claimed from U.S. provisional patent application Ser. No. 60/372,172 entitled "Soft Switching Converter Using Current Shaping" filed Apr. 12, 2002 in the name of Ionel D. Jitaru. That application is incorporated herein by reference.

FIELD OF THE INVENTION

This invention relates to DC-to-DC converters, DC-to-DC inverters and AC-to-DC converters (called generically herein "converters" or "power conversion circuits"), in which primary switching elements switches at zero voltage and secondary rectifiers have negligible reverse recovery losses.

BACKGROUND OF THE INVENTION

There is a continuing industry demand for converters of increasing power density, which means more power transferred in a given volume. A method for increasing the power transfer through a converter is to increase the switching frequency in order to minimize the size of the transformer and the capacitors. Using prior art topologies such as forward or flyback, which employ "hard" switching techniques, makes high frequency operation less efficient. The switching losses associated with switching elements that turn on when there is a voltage across them are proportional to the switching frequency. An increase in switching frequency leads to an increase in switching losses and an increase in the level of electromagnetic interference (EMI).

In order to overcome limitations in switching speeds, the prior art has devised a new family of soft transition. The U.S. Pat. Nos. 5,132,889, 5,126,931, 5,231,563 and 5,434,768 present several methods of accomplishing zero voltage across the primary switches at switching. These patents are incorporated herein by reference.

Additional power loss in converters is due to the reverse recovery in output rectifiers. During switching when a negative polarity voltage is applied to a rectifier that is in conduction, the current through the rectifier will continue to conduct until all the carriers in the rectifier's junctions are depleted. During this period of time, the current polarity will reverse the current flowing from the cathode to the anode, while the voltage across the diode is still positive from the anode to the cathode. The current flowing in reverse through the diode will reach a peak value referred to in literature as Irrm. Further on, while the rectifiers' junction is depleting the carriers, the rectifier becomes a high impedance device. The current through the rectifier will decrease rapidly from Irrm level to zero. During the same time, the negative voltage across the rectifier will build up to high levels.

During the period of time when there is a negative voltage across the diode and negative current is flowing through it, there will be power dissipation in the device. This kind of loss is referred in the literature as reverse recovery loss. The reverse recovery loss is proportional with the reverse recovery current Irrm, the negative voltage across the rectifier and the frequency.

The reverse recovery current Irrm, which is a key component in reverse recovery loss, is a function of the type of device, the temperature and the current slope at turn off. The reverse recovery characteristics are worse for higher voltage rectifiers. As a result, the reverse recovery loss becomes a significant loss mechanism for higher output voltage applications. The reverse recovery current Irrm is directly dependent on the current slope at turn off. A "soft" or low current slope reduces the reverse recovery current and as a consequence reduces the reverse recovery loss. To accomplish a very soft slope current at turn off, an inductive element has to be in series with the rectifier. The inductor element will prevent a fast current variation dI/dt. However, the presence of an inductive element in series with the rectifier will increase the negative voltage across the rectifier at turn off. The reverse voltage across the rectifier can reach very high levels and can exceed the voltage break down of the device, leading to failure.

RC snubbers or complicated lossless snubbers can be added across the rectifier to reduce the reverse recovery loss and the voltage stress on the devices. This leads to complex circuits and this negatively affects efficiency and reliability. As a result of these limitations, the high voltage converters have had to operate at lower frequency in order to reduce the power dissipation associated with reverse recovery.

Figure 2A:
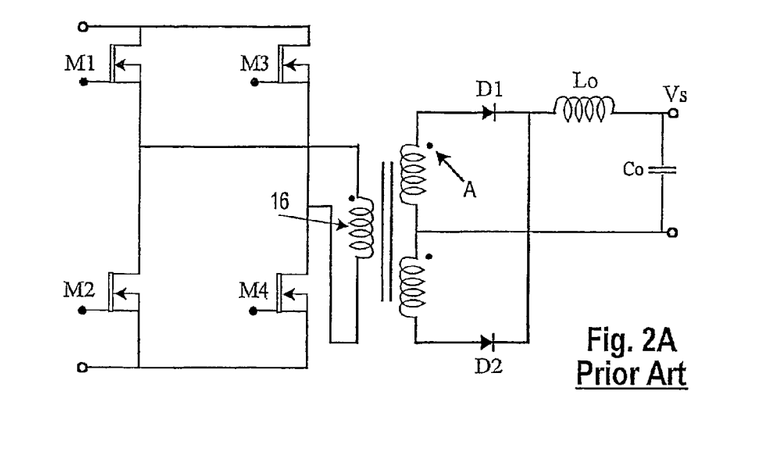
FIG. 2A is a schematic diagram of a converter wherein a prior art technique is illustrated.

FIG. 2A illustrates a standard full bridge phase shifted topology. The primary switching elements, M1, M2, M3 and M4 are controlled as depicted in the key waveforms of FIG. 2B. During the time M1 and M4 are conducting, there is a positive voltage at the dot A in the secondary winding and the rectifier D1 is conducting. When M4 turns off, in the primary winding the current will continue to conduct, and its path will be through the parasitic capacitance of M3 and M4, discharging the parasitic capacitance across M3 to zero and as a result creating zero voltage switching conditions. As a result, M3 will turn on at zero voltage. Further, M1 and M3 will be conducting. During this time, the primary winding of the transformer is shorted and the voltage in the secondary winding is zero. Both D1 and D2 will conduct during this time. The current through Lo will be split equally between D1 and D2.

At the moment when M1 turns off, the current will continue to flow in the primary discharging the parasitic capacitance of M2 towards zero. If certain conditions are met, M2 will turn on at zero voltage conditions. In any event, when M3 and M2 conduct, the polarity will change in the secondary winding. The change in polarity will force the current flowing through Lo to flow totally through D2 and the rectifier D1 will be reverse biased. Due to the reverse recovery characteristic of D1, the current will flow in reverse through D1 as shown at point 5 until the carriers in the junction are depleted. After that the rectifier D1 will behave as a high impedance device. As a function of the current slope through D1 at turn off, which determines the reverse recovery characteristics of D1, and as a function of the parasitic inductive elements Lo in series with D1, large voltage spikes will develop across D1 as shown at point 10 in FIG. 2B. This phenomenon will lead to reverse recovery losses in D1, when the reverse recovery current and reverse voltage will be present on the rectifier. In addition, these large voltage spikes developed across D1 may lead to voltage stress, which may exceed the rating of the device. For this reason, snubbing circuits may have to be employed across D1, which will increase the power dissipation, increase circuit complexity, decrease reliability and decrease power density. The reverse recovery current associated with D1 will also create a "temporary short" across the secondary winding, preventing the resonant transition across M2 from achieving zero voltage switching conditions. The voltage ringing across D1 will also lead to increased EMI.

The losses associated with the reverse recovery of the output rectifiers are proportionate with the frequency. The trend towards miniaturization requires an increase in switching frequency, which leads to more reverse recovery losses. In addition, in order to accomplish minaturization, higher efficiency in converters is necessary to minimize heat. In conclusion then, there remains a need for a topology wherein the reverse recovery losses are eliminated, in this way allowing an increase in switching frequency without a penalty in efficiency.

BRIEF SUMMARY OF THE INVENTION

This invention relates to a circuit and method to reduce the negative impact of the reverse recovery in the rectifiers in a secondary or output circuit of a converter, while allowing zero voltage switching on the primary switching elements. This technique works by forcing the current carriers out of each output rectifier of a converter before a full reverse voltage from a transformer secondary is applied to it. This circuit and method of this invention operates by shaping the current through the output rectifiers using an additional injected or supplemental AC voltage superimposed on the main AC voltage induced in the secondary winding by the primary winding. In this implementation, even though the converter operates in continuous conduction mode, the reverse recovery losses in the rectifiers, like those discussed above with respect to the spikes 10 in FIG. 2B, are totally eliminated.

Another major advantage of the proposed circuit of a preferred embodiment implementing this invention is that the current reflected in the primary is shaped to a trapezoidal form with a low dI/dt during the turn on of the primary switches. This allows the completion of the resonant transition to zero voltage across the primary switching elements.

In the preferred exemplary embodiment, a converter or power conversion circuit has a power transformer with primary and secondary windings. A primary circuit connected with the primary winding is adapted to deliver a main primary current through the primary winding of the power transformer, and a secondary circuit connected to the secondary winding is adapted to receive a main secondary current from the secondary winding and to deliver electrical power to a load. In the secondary circuit, at least one semiconductor unidirectional current conducting device, which can be a semiconductor diode or a synchronous rectifier or another such unidirectional device, is connected to pass a main current passing also through an associated one of the windings of the power transformer. An injection voltage source is connected to apply a supplemental reverse bias voltage to the semiconductor unidirectional current conducting device sufficient to terminate forward conduction in the device and to deplete carriers in junctions in the device. The depletion of carriers occurs prior to the application of the full reverse voltage across the device such as results in reverse recovery losses.

In a preferred exemplary embodiment the power conversion circuit has a pair of the semiconductor unidirectional current conducting devices connected in series with an associated secondary winding. In that embodiment, the two unidirectional current conducting devices alternately conduct through an output choke. Both devices have applied to them the reverse biasing voltage that terminates forward conduction and depletes junction carriers prior to the application of a higher level of reverse voltage such as causes reverse recovery losses.

Preferably in accordance with an exemplary embodiment of the invention, the injection voltage source is connected with the power transformer's primary. In a specific embodiment, the injection voltage source is a further transformer connected in series with the primary of the power transformer. The auxiliary transformer preferably includes one winding in series with the primary winding of the power transformer and a secondary winding connected through a capacitor to ground. In one preferred embodiment the primary circuit is a full bridge semiconductor switching circuit connected across the primary winding of the power transformer and the series connected winding of the auxiliary transformer. In this embodiment, the auxiliary transformer injects a triangular AC current that is applied to the junction of pairs of the transistor switches that form the input bridge. This assures zero voltage switching of those switches regardless of load on the circuit. Where the secondary of the power transformer has a pair of secondary windings each series connected with one of the semiconductor unidirectional current conducting devices, those windings can be separate, distinct windings or the opposite halves of a center-tapped winding. As used herein, the terms "split winding" or "pair of windings" are not meant to distinguish either a single center-tapped winding or two serially-connected windings.

The windings of the power transformer are preferably wound such that when the injection voltage produces the first supplemental reverse bias voltage, reverse biasing the first of the pair of semiconductor unidirectional current conducting devices, the injection voltage also produces a first supplemental forward biasing voltage across the second of the devices, and when the injection voltage produces the second supplemental reverse bias voltage reverse biasing the second of the semiconductor unidirectional current conducting devices, the injection voltage also produces a second supplemental forward biasing voltage across the first of the devices.

A DC input to the primary circuit can be a rectified AC or a DC input from a DC source. The bridge-connected switching devices are preferably four electrically controlled unidirectional semiconductor switches (MOSFETS for example) that are electrically controlled to provide current in a first direction through the primary winding of the power transformer, then a short across the primary winding and its injection voltage source, then a current in a reverse direction through the primary winding, and then again a short across the primary winding and its injection voltage source. Across the secondary winding or windings is produced a first relatively high voltage forward biasing a semiconductor unidirectional current conducting device, then a period of only the injection voltage-induced, relatively low secondary voltage reverse biasing the device, followed by a second relatively high reverse biasing voltage, and then another period of only the injection voltage-induced, relatively low secondary voltage, now in the forward bias direction.

It will be seen that in accordance with the method of the invention a reverse bias voltage is applied to a semiconductor rectifier to deplete at least one semiconductor junction of carriers in advance of each application of a higher reverse biasing power transformer secondary voltage excursion. This avoids substantial reverse recovery losses. This is accomplished by applying an injection voltage waveform to the primary of a power transformer that couples an input or primary circuit to an output or a secondary circuit. Preferably the application of the injection voltage in accordance with the preferred method is by an auxiliary transformer having one winding connected to the primary of the power transformer and a second winding connected as described, i.e. through a capacitor to ground.

Of course in each of the methods, the object is to apply the lower reverse biasing voltage to each semiconductor rectifier or other semiconductor unidirectional current conducting devices in the secondary circuit so as to deplete the devices of carriers before a higher reverse biasing voltage is delivered to the device from the secondary of the power transformer to cause high reverse recovery losses. The depleted carriers are conducted by a secondary, conducting semiconductor rectifier.

The method of the preferred embodiment implementing the invention has the further advantage of adding an alternating current having a generally triangular waveform into the primary circuit to a set of semiconductor switching devices that make up a circuit that switches DC voltage to supply the power transformer primary. This current assures zero voltage switching by those switching devices.

The above and further objects and advantages of the invention will be better understood from the following detailed description of at least one preferred embodiment of the invention, taken in consideration with the accompanying drawings. In the several figures of the drawings like reference numbers denote like elements.

DETAILED DESCRIPTION

Figure 1A:
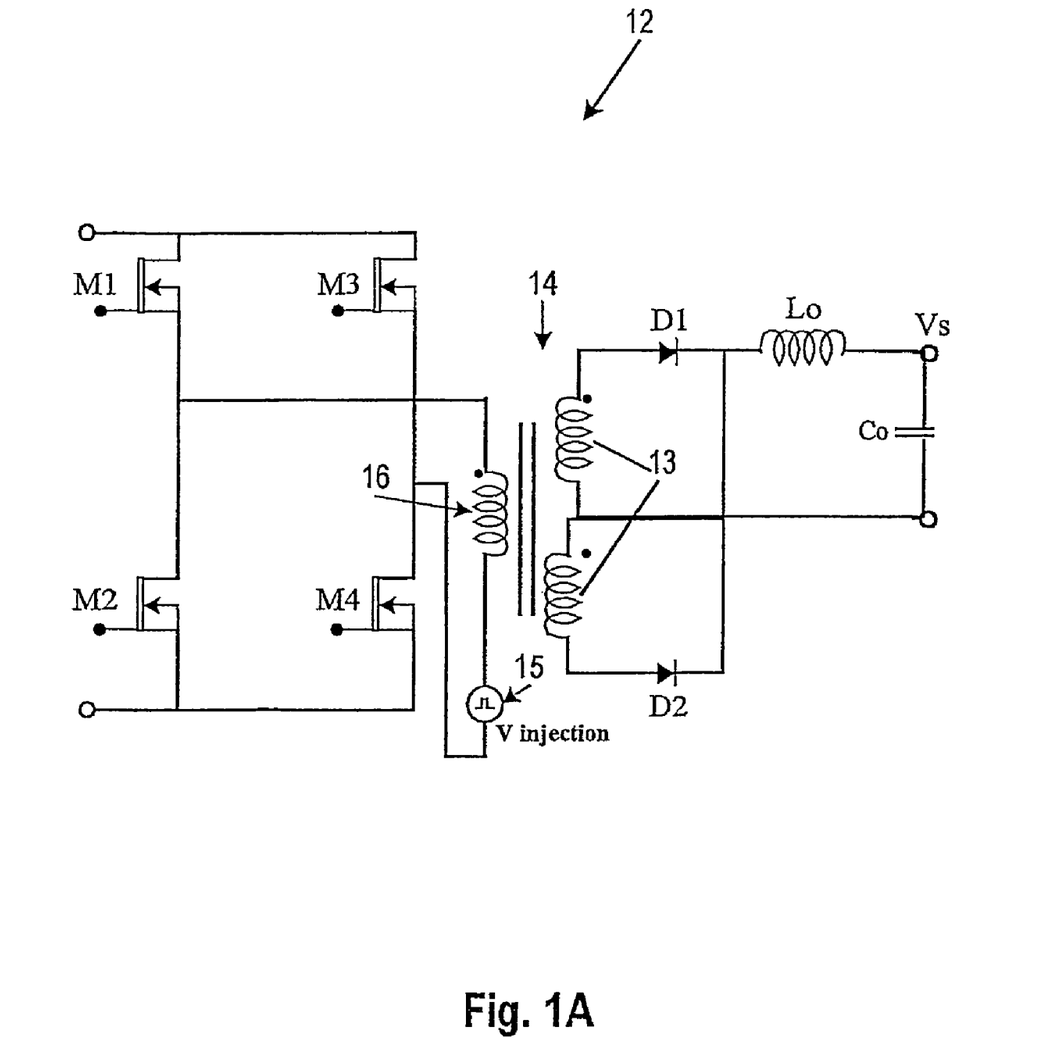
FIG. 1A is a schematic diagram of a converter utilizing the power transfer methodology of the invention.
Figure 1B:
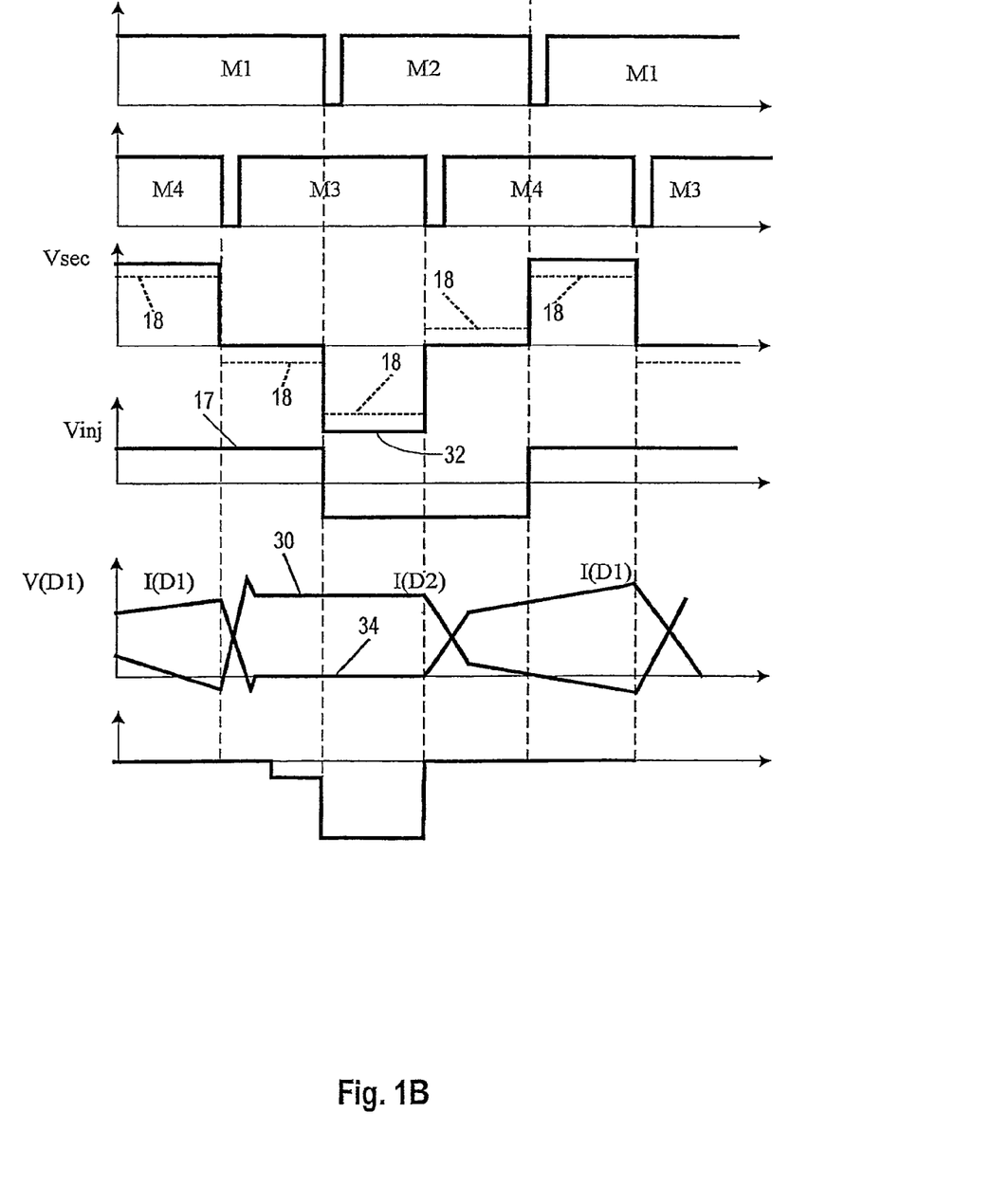
FIG. 1B is a series of plots of voltages and currents of the circuit of FIG. 1A versus time.

The present invention addresses the goal of eliminating the reverse recovery losses while maintaining continuous conduction mode in an output choke of a converter. The general concept is described in connection with FIG. 1A. It consists in adding an additional AC voltage source, which will generate a low voltage square waveform signal. FIG. 1A is a simplified schematic, and FIG. 1B illustrates key waveforms, both for the topology according to this invention. The circuit 12 of FIG. 1A is a typical full bridge, phase shifted topology, with an additional low voltage AC source 15 placed in series with a primary winding 16 of a power transformer 14.

In FIG. 1B, the conventional control signals for the primary switching elements M1, M2, M3 and M4 are also depicted in the plots so labeled. The injected AC voltage, Vinj, will alter the voltage Vsec in the secondary 13 of the transformer as is depicted by the dotted lines 18 in FIG. 1B.

Figure 2B:
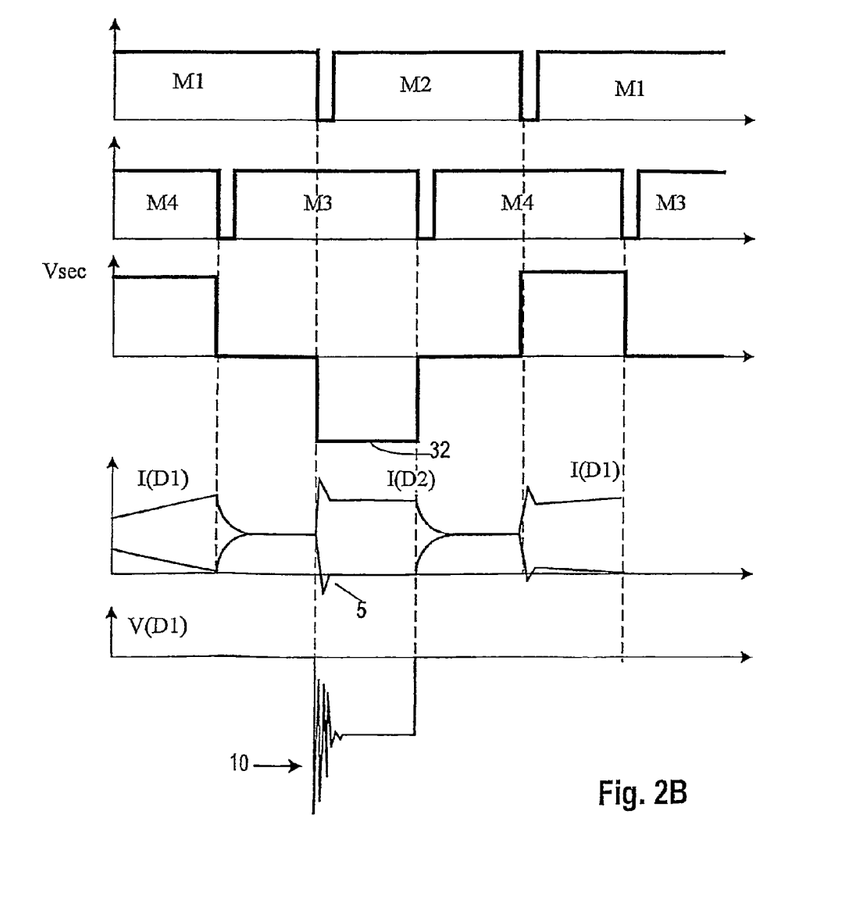
FIG. 2B is a series of plots of voltages and currents of the circuit of FIG. 2A versus time.

During the time wherein M1 and M4 are conducting, the voltage induced in the secondary winding has a positive polarity at the dot A and D1 is conducting. When M4 ceases to conduct, the injected voltage 17 of the source 15 produces the voltage 18 in the secondary winding with a low amplitude and negative polarity at the dot A. This will force the current out of D1 and into D2. Without the injected voltage 16 the current through Lo would be equally split between D1 and D2, as in the circuit of FIG. 2A At the time when M1 is turned off and M2 is turned on, the voltage induced in the secondary winding will change polarity, creating a negative voltage at the dot A. This will not change the current flow in the secondary, because D2 is already in full conduction, as indicated at 30 in FIG. 1B. Without the injected voltage at this time, both D1 and D2 would be in full conduction and, as illustrated in FIG. 2B, the negative voltage 32 induced in the secondary winding would be applied to D1 leading to reverse recovery currents 5 and as a result reverse recovery losses. However, in accordance with the present invention, as shown at point 34 in FIG. 1B, conduction in D1 has already been brought to a halt by the reverse bias applied by the voltage 18 generated in the secondary by the auxiliary AC source 15.

Figure 3A:
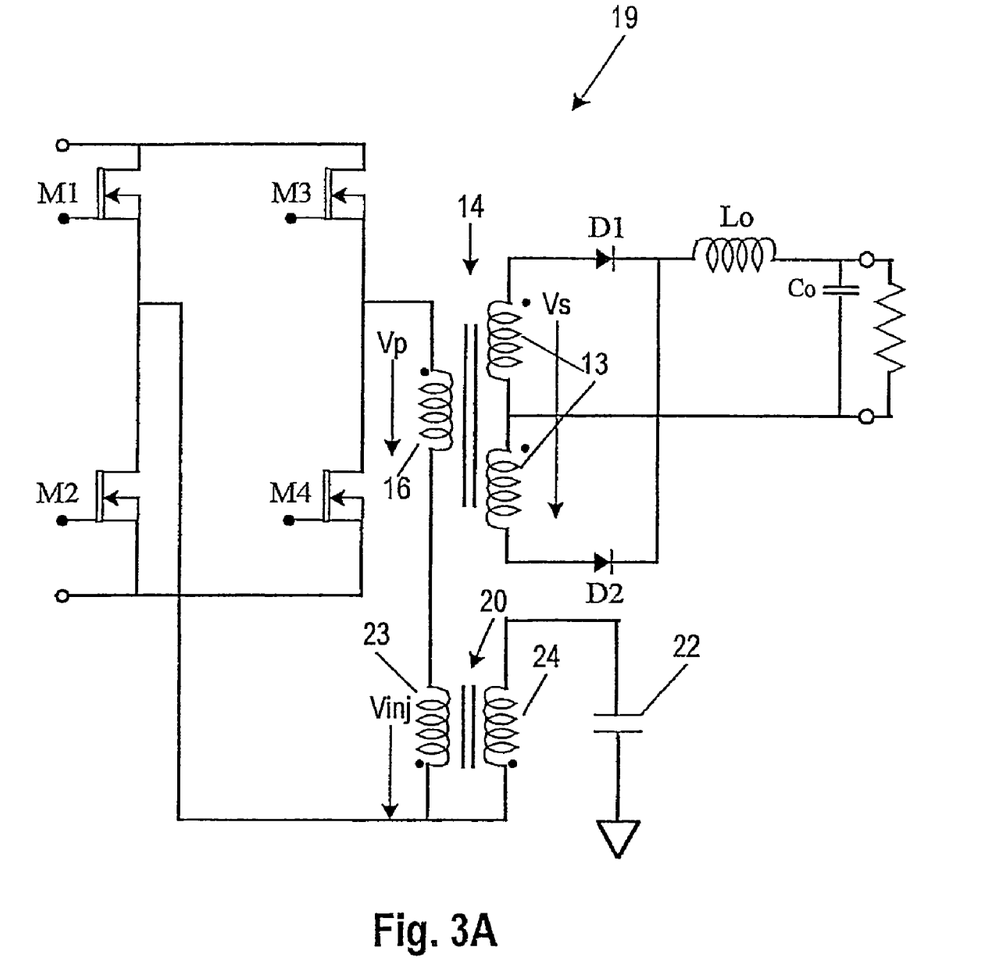
FIG. 3A is a schematic diagram of a specific exemplary embodiment of a converter configured in accordance with this invention.
Figure 3B:
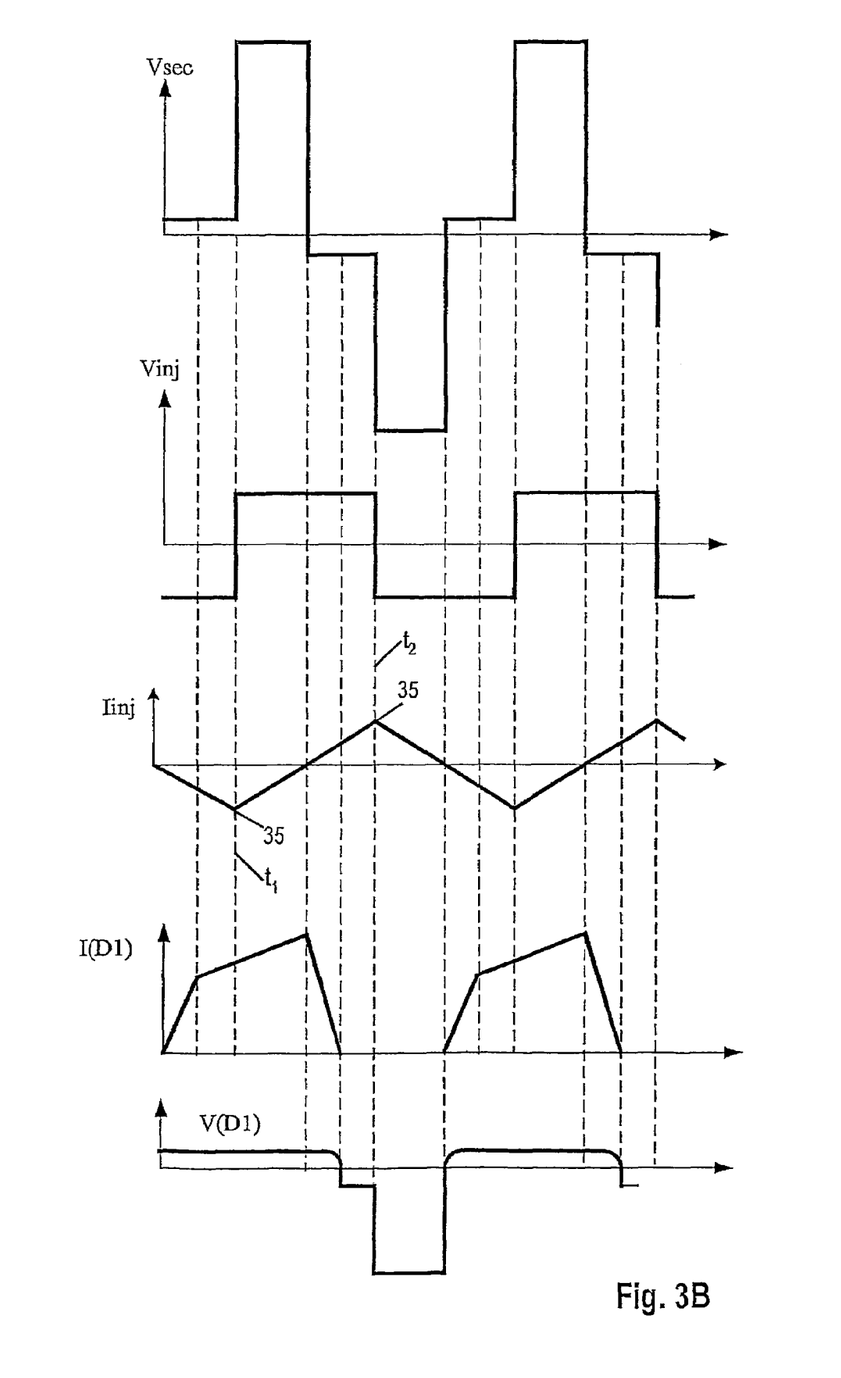
FIG. 3B is a series of plots of voltages and currents of the circuit of FIG. 3A versus time.

Turning to FIG. 3A, in a circuit 19 implementing the invention, the additional injected voltage is provided by a small additional transformer 20 in series with the primary winding 16 and an additional capacitor 22. In FIG. 3B, the key waveforms of the circuit 19 are depicted. The additional magnetic element 20 has a primary winding 23 in series with the primary winding 16 of the main transformer and a secondary winding 24 in series with the capacitor 22 which is connected to ground. It accomplishes several tasks. First it creates the AC signal Vinj in series with the primary winding. As explained, this forces the output rectifiers out of conduction during the dead time, before the voltage polarity reverses in the secondary, thus preventing the reverse recovery losses.

The second effect of this particular implementation is the creation of an additional triangular current Iinj in the winding 24. This is injected into the current in the primary circuit to form a trapezoidal waveform with low dI/dt. The current thus shaped is injected at the connection between M1 and M2, ensuring zero voltage switching conditions even at light load. This is shown in FIG. 3B. There, when switch M1 turns ON at $T_1$, the injected current Iinj is flowing toward the switch M1, or in other words in the source to drain direction through M1 reducing the voltage across that switch. When M2 turns on at $t_2$, the current Iinj has reversed, M1 is OFF and Iinj at 36 is being drawn through the switch M2 in the source to drain direction reducing the voltage on M2. The effect on M3 and M4 can be seen to be the same.

Figure 4:
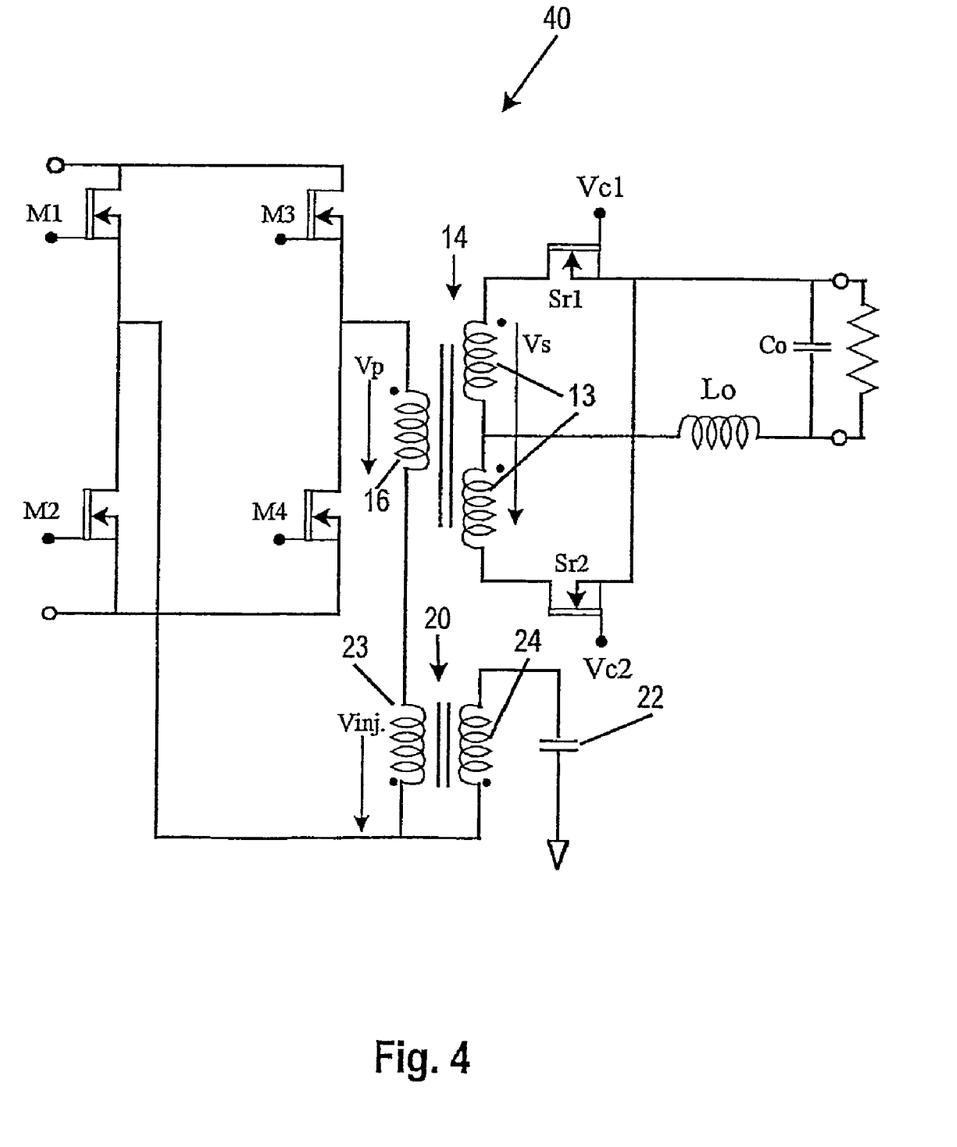
FIG. 4 is a schematic diagram of a further specific embodiment of a converter configured in accordance with this invention.

In FIG. 4, a circuit 40 is a further embodiment of the present invention. The diodes D1 and D2 of the previously described embodiments are replaced with synchronous rectifiers Sr1 and Sr2. One of the limitations associated with synchronous rectification is the conduction of the body diode, when the synchronous rectifier is turned off before the voltage polarity changes. Ordinarily, current will flow through the body diode when the polarity changes in the secondary. The reverse recovery characteristics of the body diode are worse than ultra fast rectifiers. The advantage of a lower voltage drop on the rectifier is offset by the additional reverse recovery losses. This problem gets worse in higher voltage applications, larger than 24V for example, where the reverse recovery loss mechanism is the dominant rectification loss. In the present invention, which eliminates the reverse recovery losses ordinarily occurring upon reverse biasing of the input switches by the full input voltage-induced secondary voltage, it is very beneficial to replace the diodes with the synchronous rectifiers Sr1 and Sr2 of FIG.

4. Again the specific implementation shown assures zero voltage switching in the switching elements M1–M4.

The foregoing descriptions of preferred embodiments are exemplary and not intended to limit the claimed invention. Obvious modifications that do not depart from the spirit and scope of the invention as claimed will be apparent to those skilled in the art.

What is claimed is:

1. A power conversion circuit having a power transformer, four semiconductor switching elements connected as a bridge across an input to the power conversion circuit and connected to a primary winding of the power transformer to reverse current through the primary winding, a split secondary winding on the power transformer, a first unidirectional current conducting device connected from one end of the split secondary winding to an inductor, a second unidirectional current conducting device connected from a second end of the split secondary winding to the inductor, the inductor and a connection to an interconnection between two halves of the split secondary winding being connected to an output of the power conversion circuit, an injection voltage source connected to the primary winding of the power transformer for applying an injection voltage to the primary winding in addition to an input voltage to the primary winding via the semiconductor switching elements connected as a bridge.

2. The power conversion circuit according to claim 1, wherein the injection voltage source is a winding on an injection voltage transformer, said winding being connected in series with said primary winding of the power transformer.

3. The power conversion circuit according to claim 2, wherein the injection voltage transformer has a further winding connected to a capacitor.

4. The power conversion circuit according to claim 1, wherein the unidirectional current conducting devices are semiconductor switching devices.

5. A power conversion circuit having a power transformer with at least one primary winding and at least one secondary winding, a primary circuit connected with the primary winding and adapted to deliver a main primary current alternating in direction through the primary winding, a secondary circuit connected to the secondary winding and adapted to receive a main secondary current from the secondary winding and to deliver electrical power to a load, at least one semiconductor unidirectional current conducting device in at least one of the primary and secondary circuits and adapted alternately to conduct a main current passing through an associated one of the windings of the power transformer; the improvement comprising:

an injection voltage source connected to apply a supplemental reverse bias voltage to the semiconductor unidirectional current conducting device sufficient to terminate forward conduction in the device and to deplete carriers in the device at times prior to each reverse biasing of the device by an alternating of the main primary current causing a reversal of voltage across the associated power transformer winding.

6. The power conversion circuit according to claim 5, wherein the at least one semiconductor unidirectional current conducting device comprises two such devices each connected in series with an associated secondary winding.

7. The power conversion circuit according to claim 5, wherein the injection voltage source is coupled to the at least one primary winding to develop across the at least one secondary winding a voltage producing across the semiconductor unidirectional current conducting device the supplemental reverse bias voltage.

8. The power conversion circuit according to claim 6, wherein the injection voltage source is connected in current conducting relation with the at least one power transformer primary winding to develop across each secondary winding of the power transformer associated with a semiconductor unidirectional current conducing device the supplemental reverse biasing voltage biasing each of the semiconductor unidirectional current conducting devices.

9. The power conversion circuit according to claim 7, wherein the injection voltage source is an auxiliary transformer having a first winding connected in series with the at least one primary winding of the power transformer and having a second winding connected to a capacitor, whereby current developed in the first winding of the auxiliary transformer is supplied through the at least one primary winding of the power transformer timed to generate a voltage in the secondary winding of the power transformer producing the supplemental reverse bias voltage.

10. The power conversion circuit of claim 5, wherein the at least one semiconductor unidirectional current conducting device comprises at least one rectifying diode connected in series with the at least one secondary winding between the at least one secondary winding and a load connection.

11. The power conversion circuit according to claim 10, wherein the at least one rectifying diode comprises a pair of rectifying diodes, each connected in series with at least one power transformer secondary winding.

12. The power conversion circuit according to claim 5, wherein the at least one semiconductor unidirectional current conducting device comprises at least one rectifying electrically controlled semiconductor switching device connected in series with the at least one secondary winding between the at least one secondary winding and a load connection.

13. The power conversion circuit according to claim 12, wherein the at least one electrically controlled semiconductor switching device comprises a pair of rectifying electrically controlled semiconductor switching devices, each connected in series with at least one power transformer secondary winding.

14. The power conversion circuit according to claim 12, wherein the at least one electrically controlled semiconductor switching device is a synchronous rectifier.

15. The power conversion circuit according to claim 13, wherein the pair of electrically controlled semiconductor switching devices is a pair of synchronous rectifiers, each connected in series with at least one power transformer secondary winding.

16. The power conversion circuit according to claim 6, wherein the power transformer has a pair of secondary windings each connected in series with one of the semiconductor unidirectional current conducting devices, the primary circuit comprises a circuit for delivering an alternating current through the at least one primary winding to produce alternating voltages across the secondary windings alternately biasing the semiconductor unidirectional current conducting devices into and out of conduction, the injection voltage source being a source of alternating voltage connected with the at least one primary winding of the power transformer to produce alternately in the pair of secondary windings a first supplemental reverse bias voltage reverse biasing a first of the pair of semiconductor unidirectional current conducting devices and a second supplemental reverse bias voltage reverse biasing a second of the pair of semiconductor unidirectional current conducting devices.

17. The power conversion circuit according to claim 16, wherein the at least one primary winding and the secondary windings of the power transformer are wound such that when the injection voltage produces the first supplemental reverse bias voltage reverse biasing the first of the pair of semiconductor unidirectional current conducting devices, the injection voltage also produces a first supplemental forward bias voltage forward biasing the second of the devices, and when the injection voltage produces the second supplemental reverse bias voltage reverse biasing the second of the semiconductor unidirectional current conducting devices, the injection voltage also produces a second supplemental forward bias voltage forward biasing the first of the devices.

18. The power conversion circuit according to claim 16, wherein the circuit for delivering an alternating current through the at least one primary winding comprises a plurality of electrically controlled unidirectional semiconductor switches connected in a bridge configuration between a DC input connection and the at least one primary winding of the power transformer.

19. The power conversion circuit according to claim 18, wherein the at least one primary winding of the power transformer and the injection voltage source are connected in series and connected to a junction of a pair of the electrically controlled unidirectional semiconductor switches to deliver a current to the junction of the switches, whereby substantially zero voltage switching of the switches is assured.

20. The power conversion circuit according to claim 16, wherein the circuit for delivering an alternating current through the at least one primary winding comprises a full bridge circuit coupled to the at least one primary winding and adapted to be connected across a DC source.

21. The power conversion circuit according to claim 20, wherein the full bridge switching circuit comprises four electrically controlled unidirectional semiconductor switches.

22. The power conversion circuit according to claim 21, wherein the four electrically controlled unidirectional semiconductor switches are electrically controlled to provide current in a first direction through the at least one primary winding, a short across the at least one primary winding and the injection voltage source, current in a reverse direction through the at least one primary winding, and then again a short across the primary winding and the injection voltage source, whereby the first and second secondary windings produce voltages of opposite polarities with intervening periods of a substantially lower voltage induced therein by the injection voltage.

23. The power conversion circuit according to claim 22, wherein the at least one primary winding of the power transformer is connected at one end to a junction of a pair of the electrically controlled switches, and in series with the injection voltage source, the injection voltage source being connected to a junction of a further pair of the electronically controlled switches, the at least one primary winding and injection voltage source delivering current substantially triangular in its plot of current versus time to the junctions of the pairs of electrically controlled switches to assure substantially zero voltage switching thereby.

24. The power conversion circuit according to claim 23, the injection voltage source producing substantially an AC square wave voltage.

25. The power conversion circuit according to claim 24, wherein the injection voltage source comprises an auxiliary transformer having a primary connected in series with the at least one primary of the power transformer and having a secondary connected to a capacitor connected to ground.

26. A power conversion circuit having a power transformer with a primary winding and at least one secondary winding, an input circuit connected to the primary winding, an output circuit connected with the at least one secondary winding and having a semiconductor rectifying means coupled in current conducting relation with the at least one secondary winding, an inductor coupled in current conducting relation between the semiconductor rectifying means and an output load connection; the improvement comprising:

means for applying a first, relatively low reverse bias voltage to the semiconductor rectifying means to halt forward conduction and deplete carriers in the semiconductor rectifying means prior to each application to the semiconductor rectifying means of a reverse bias larger than the first, relatively low reverse bias voltage.

27. The power conversion circuit according to claim 26, wherein the means for applying a reverse bias voltage comprises means for injecting a supplemental voltage on the primary winding of the power transformer in addition to a main excitation voltage applied by the input circuit to the primary winding.

28. The power conversion circuit according to claim 27, wherein the means for injecting a supplemental voltage comprises an auxiliary transformer connected with the primary winding of the power transformer to apply a supplemental voltage that is an alternating voltage producing in the at least one secondary winding of the power transformer the first, relatively low reverse bias voltage.

29. The power conversion circuit according to claim 28, wherein the semiconductor rectifying means comprises first and second semiconductor rectifying devices connected with first and second secondary windings of the power transformer, the auxiliary transformer applies an alternating voltage of first and second primary voltage levels to produce in the first and second secondary windings first and second secondary voltage levels reverse biasing the first and second rectifying devices, respectively.

30. The power conversion circuit according to claim 26, wherein the semiconductor rectifying means comprises a pair of semiconductor unidirectional current conducting devices, and the means for applying a reverse bias voltage alternately reverse biasing the semiconductor unidirectional current conducting devices and driving carriers from that device into the other, conducting unidirectional current conducting device.

31. The power conversion circuit according to claim 30, wherein the means for applying a first, relatively low reverse bias voltage comprises means for applying an alternating voltage to the primary winding of the power transformer, wherein the input circuit comprises a plurality of semiconductor switching means, connected with the power transformer primary winding and the means for applying an alternating voltage, the means for applying an alternating voltage being connected into the primary circuit to inject alternating current into the semiconductor switching means to assure substantially zero voltage switching thereof.

32. In a method of power conversion including switching a DC voltage to supply a power transformer primary, and rectifying with at least a first semiconductor rectifier a transformer output from a secondary of the power transformer; the improvement comprising applying to the semiconductor rectifier a relatively low reverse bias voltage to deplete at least one semiconductor junction of the semiconductor rectifier of carriers in advance of each application to the semiconductor rectifier of a relatively high reverse biasing power transformer secondary voltage excursion.

33. The method according to claim 32, wherein rectifying with a semiconductor rectifier a power transformer output comprises rectifying the power transformer output with at least a second semiconductor rectifier; the improvement further comprising applying to the second semiconductor rectifier a relatively low reverse bias voltage to deplete at least one semiconductor junction of the second semiconductor rectifier of carriers in advance of each application of a relatively high reverse biasing power transformer secondary voltage excursion.

34. The method according to claim 32, wherein applying to the semiconductor rectifier a reverse bias comprises applying an alternating injection voltage waveform to the primary of the power transformer to produce in a secondary of the power transformer the reverse bias voltage applied to the semiconductor rectifier.

35. The method according to claim 33, wherein applying to the first and second semiconductor rectifiers a reverse bias comprises applying an alternating injection voltage waveform to the primary of the power transformer to produce in a secondary of the power transformer the reverse bias voltages applied to the first and second semiconductor rectifiers.

36. The method according to claim 34, wherein applying an injection voltage comprises providing an auxiliary transformer having a first winding connected to the primary of the power transformer and having a second winding connected through a capacitor to ground.

37. The method according to claim 33, further comprising applying to each semiconductor rectifier the reverse bias when the remaining semiconductor rectifier is conducting.

38. The method according to claim 37, wherein applying to each semiconductor rectifier the reverse bias comprises driving carriers out of the reverse biased rectifier and into the conducting rectifier.

39. The method according to claim 37, wherein applying the reverse bias further comprises applying the reverse bias to each semiconductor rectifier before application of a higher voltage reverse biasing voltage thereto generated by the switched DC voltage supplied to the power transformer primary.

40. The method according to claim 32, further comprising supplying an alternating current to a semiconductor switching circuit that switches the DC voltage to supply the power transformer primary to assure zero voltage switching thereof.

41. The method according to claim 34, further comprising providing a full bridge semiconductor switching circuit as an input across the power transformer primary and a source of the reverse bias voltage, activating the switching circuit to apply as the input a first voltage of a first polarity and a second voltage of an opposite polarity and between each first and opposite polarity voltage, substantially no voltage.

* * * * *